Figure 1:
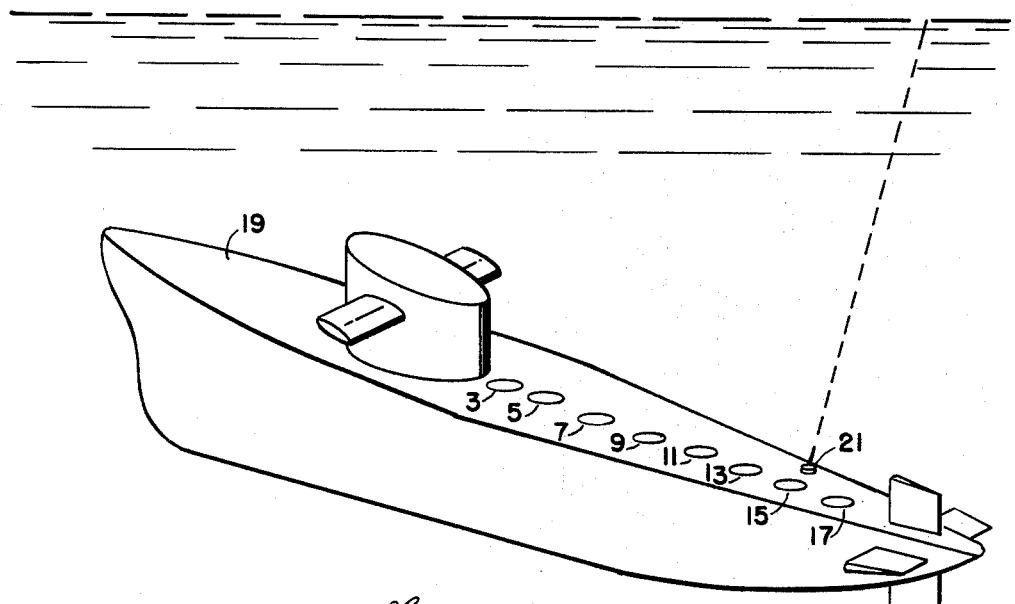

July 26, 1966  J. H. BROWN ET AL  3,263,206
METHOD FOR DETERMINING TIME-AVERAGED DEPTH
Filed Nov. 26, 1963  2 Sheets-Sheet 1

INVENTOR.
JAMES H. BROWN
THOMAS A. PRISCILLA
BY

ATTORNEY

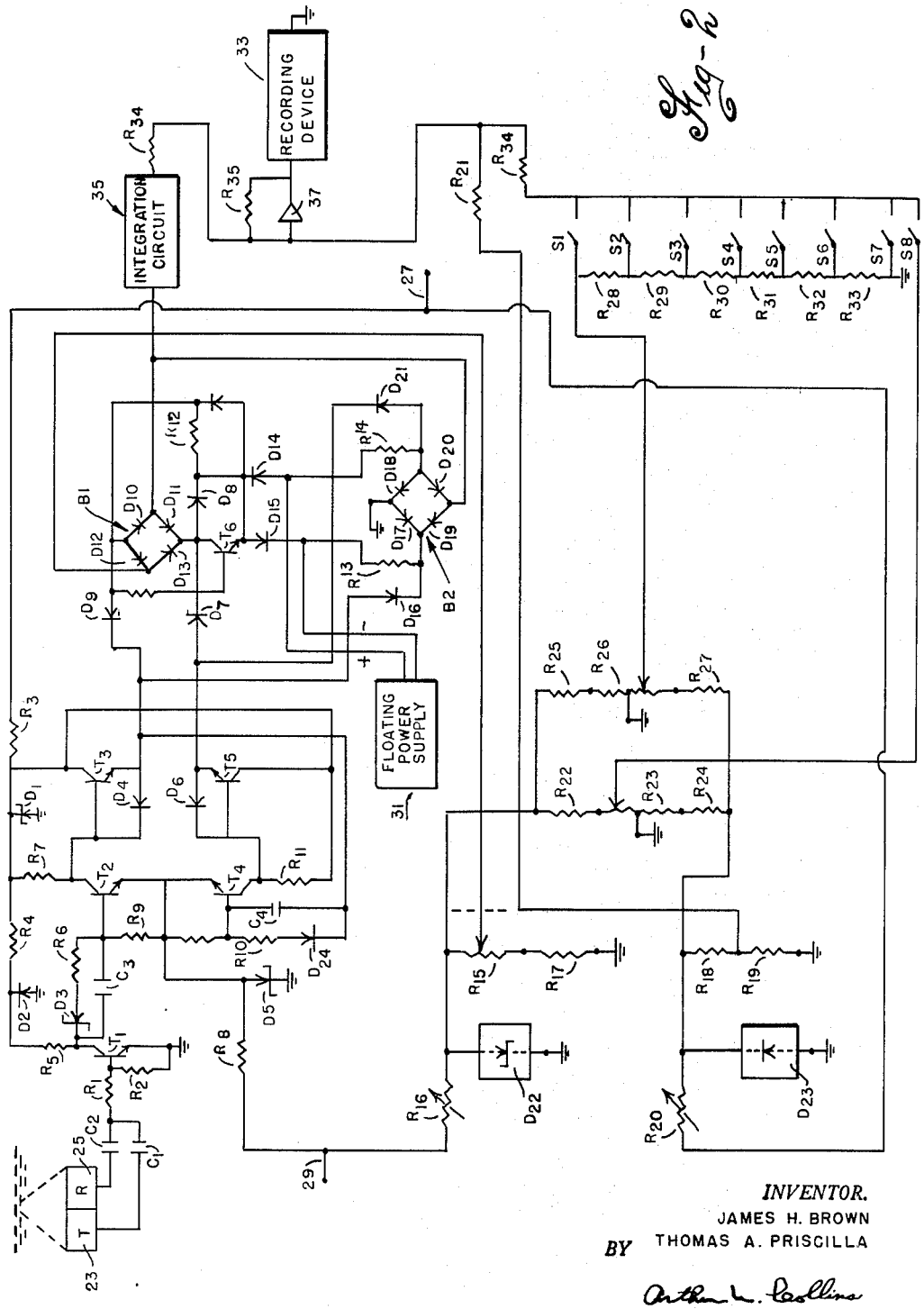

United States Patent Office 3,263,206
Patented July 26, 1966

3,263,206
METHOD FOR DETERMINING TIME-AVERAGED DEPTH
James H. Brown, Severna Park, and Thomas A. Priscilla, Ferndale, Md., assignors, by mesne assignments, to the United States of America as represented by the Secretary of the Navy
Filed Nov. 26, 1963, Ser. No. 326,306
2 Claims. (Cl. 340—3)

The present invention relates to novel and improved water depth measuring apparatus and more particularly to novel and improved apparatus for measuring the depth of a submerged platform or vessel beneath a water surface by means of the transmission and reflections of sonic waves.

Specially designed computers are used to control the firing of ballistic missiles launched from a submerged vessel or submarine. One of the input parameters to computers of this kind is a voltage which is proportional to the depth of water above the launching tube that is to be fired. Although various types of sonic apparatus are available to determine distances and depths beneath water, no such apparatus has been devised heretofore which meets the precise requirements of a ballistic missile computer system.

It is therefore a principal object of the present invention to provide apparatus which determines depth in water in the form of an electrical potential with particular accuracy and reliability.

Other objects and many of the attendant advantages of this invention will be readily appreciated as the same becomes better understood by reference to the following detailed description when considered in connection with the accompanying drawing wherein:

FIG. 1 is a diagram showing a preferred arrangement of missile launching tubes on the aft deck of a vessel or submarine; and FIG. 2 is a diagrammatic view of a preferred embodiment of the improved depth measuring circuitry of the present invention.

Referring now to the drawing a plurality of pairs of missile launching tubes 3, 5, 7, 9, 11, 13, 15 and 17 are shown located on the aft deck of the vessel or submarine 19. The common transducer 21 for the transmitter 23 and the receiver 25 of the sonar gear is preferably positioned as shown adjacent to the pair of tubes at 15. Transmitter 23 and receiver 25 are coupled to the base of transistor $T_1$ respectively through condensers $C_1$ and $C_2$ and through resistors $R_1$ and $R_2$. The emitter-collector circuit of transistor $T_1$ extends from the positive 55 volt supply line 27 through resistors $R_3$, $R_4$ and $R_5$ and through the transistor to ground. The zener type diodes $D_1$ and $D_2$ respectively coupled to the junction of resistors $R_3$ and $R_4$ and the junction of resistors $R_4$ and $R_5$ stabilize the potential on supply line 27. The collector of transistor $T_1$ is coupled to the base of transistor $T_2$ through the parallel arrangement of the zener diode $D_3$ and resistor $R_6$ with condenser $C_3$. The emitter collector circuit of transistor $T_2$ extends from supply line 27 through resistors $R_3$ and $R_7$, through the transistor and through resistor $R_8$ to the negative 55 volt supply line 29. The base of transistor $T_2$ is connected to its emitter through resistor $R_9$. The collector of transistor $T_2$ is connected to the base of transistor $T_3$. The emitter collector circuit of transistor $T_3$ extends from the supply line 27 through resistor $R_3$, the transistor, diode $D_4$, transistor $T_2$ and resistor $R_8$ to the negative supply line 29. The emitter of transistor $T_3$ is coupled to the base of transistor $T_4$ through the parallel arrangement of zener diode $D_{24}$ and resistor $R_{10}$ with condenser $C_4$. The emitter collector circuit of transistor $T_4$ extends from supply line 27 through resistors $R_3$ and $R_{11}$, the transistor and resistor $R_8$ to the negative supply line 29. Zener diode $D_5$ couples the junction of resistor $R_8$ and the emitters of transistors $T_2$ and $T_4$ to ground. The collector of transistor $T_4$ is connected to the base of transistor $T_5$. The emitter collector circuit of transistor $T_5$ extends from supply line 27 through resistor $R_3$, the transistor, diode $D_6$, transistor $T_4$ and resistor $R_8$ to negative supply line 29.

The emitter of transistor $T_5$ is connected to emitter of transistor $T_3$ through a circuit that includes diodes $D_7$ and $D_8$, resistor $R_{12}$ and diode $D_9$. The diode bridge which includes $D_{10}$, $D_{11}$, $D_{12}$ and $D_{13}$ is connected between the junction of resistor $R_{12}$ and diode $D_9$ and the junction of diodes $D_7$ and $D_8$. The floating potential power supply 31 is connected to the junction of diode $D_8$ and resistor $R_{12}$ through diode $D_{14}$ and to the junction of diodes $D_7$ and $D_8$ through the emitter collector circuit of transistor $T_6$ and diode $D_{15}$. The junction of diode $D_{10}$ with diode $D_{11}$ is connected to the depth indicating and/or recording device 33 through the integration circuit 35 and the summing amplifier 37. The emitter of transistor $T_3$ is coupled to the emitter of transistor $T_5$ through a circuit that includes diode $D_{16}$, the diode bridge of diodes $D_{17}$, $D_{18}$, $D_{19}$ and $D_{20}$ and diode $D_{21}$. The floating potential power supply 31 is connected to the junction of diode $D_{16}$ with the diode bridge through resistor $R_{13}$ and to the junction of diode $D_{21}$ with the diode bridge through resistor $R_{14}$. The junction of diodes $D_{19}$ and $D_{20}$ is connected to input circuit of integrator 35 and the junction of diodes $D_{17}$ and $D_{18}$ is connected to ground.

Potentiometer $R_{15}$ is energized by a circuit that extends from the negative 55 volt power supply line 29 successively through variable resistor $R_{16}$, the potentiometer and resistor $R_{17}$ to ground. The voltage regulator $D_{22}$ which preferably takes the form of a zener diode is coupled between the junction of variable resistor $R_{16}$ and potentiometer $R_{15}$ and ground. The variable arm of potentiometer $R_{15}$, which is preferably manually set to compensate for changes in the velocity of sound through water at different temperatures in a manner which will be more clearly understood hereinafter, is connected to the junction of diodes $D_{12}$ and $D_{13}$.

Series connected resistors $R_{18}$ and $R_{19}$ are energized by a circuit that extends from the positive 55 volt supply line 27 successively through variable resistor $R_{20}$ and resistors $R_{18}$ and $R_{19}$ to ground. The voltage regulator $D_{23}$ which preferably takes the form of a zener diode is coupled between the junction of resistor $R_{20}$ and resistor $R_{18}$ and ground. The junction of resistors $R_{18}$ and $R_{19}$ is connected to the input of summing amplifier 37 through resistor $R_{21}$.

The junction of variable resistor $R_{16}$ with potentiometer $R_{15}$ is connected to the junction of variable resistor $R_{20}$ with resistor $R_{18}$ through resistor $R_{22}$, potentiometer $R_{23}$ and resistor $R_{24}$. The junction of variable resistor $R_{16}$ with potentiometer $R_{15}$ is also connected to the junction of variable resistor $R_{20}$ with resistor $R_{18}$ through resistor $R_{25}$, potentiometer $R_{26}$ and resistor $R_{27}$. The center tops of potentiometers $R_{23}$ and $R_{26}$ are each connected to ground. The variable arm of potentiometer $R_{26}$, which is automatically positioned by a suitable pitch servo device in a manner that will be more apparent hereinafter is connected to ground through resistors $R_{28}$, $R_{29}$, $R_{30}$, $R_{31}$, $R_{32}$, and $R_{33}$. The variable arm of potentiometer $R_{26}$ and the junctions of series connected resistors $R_{28}$, $R_{29}$, $R_{30}$, $R_{31}$, $R_{32}$ and $R_{33}$ are connected to summing amplifier 37 through manual switches $S_1$, $S_2$, $S_3$, $S_4$, $S_5$, $S_6$, and $S_7$ and through resistor $R_{34}$. The variable arm of potentiometer $R_{23}$ is connected to summing amplifier 37 through switch $S_8$ and resistor $R_{34}$.

In operation measurement of the interval between the emission of a pulse from transmitter 23 and receipt of its echo pulse provides the desired basic indication of the depth of a launching tube beneath the surface of the water. In order to obtain this measurement, the base of transistor $T_1$ is driven in a positive direction each time transmitter 23 emits a sonar pulse. When this occurs, current flow through transistor $T_1$ increases and the resulting negative pulse at its collector is fed through condenser $C_3$ and zener diode $D_3$ to the base of transistor $T_2$. This reduces the flow of current through transistor $T_2$ and produces a positive pulse at its collector which in turn increases the flow of current through the cathode follower circuit of transistor $T_3$ and provides a positive step at its emitter. This positive step at the emitter of transistor $T_3$ is coupled to the base of transistor $T_4$ through condenser $C_4$ and zener diode $D_{24}$. This increases the flow of current through transistor $T_4$, reduces the potential at the collector of transistor $T_4$, reduces the flow of current through the cathode follower circuit of transistor $T_5$ and provides a negative step at the emitter of transistor $T_5$.

The positive potential and the negative potential thus respectively produced at the emitters of transistors $T_3$ and $T_5$ is not imposed across the diode bridge $B_1$ due to the orientation of diodes $D_7$ and $D_9$. Thus current from the floating power supply 31 flows through the circuit that includes diode $D_{14}$, resistor $R_{12}$, the series parallel arrangement of diodes $D_{10}$, $D_{11}$ $D_{12}$ and $D_{13}$, transistor $T_6$ and diode $D_{15}$. This conditions the bridge $B_1$ such that current from the negative power supply line 29 flows through variable resistor $R_{16}$, potentiometer $R_{15}$, the bridge, to a suitable charging condenser in integrator 35. It will be noted that the positive potential and the negative potential respectively produced at the emitters of transistors $T_3$ and $T_5$ back biases the diode bridge $B_2$ and therefore blocks the flow of current from the floating power supply 31 through resistor $R_{14}$, the bridge $B_2$, and resistor $R_{13}$. This conditions the bridge $B_2$ such that the circuit from the junction of the bridge $B_1$ with integrator 35 through bridge $B_2$ is not short circuited to ground. Thus, when the transmitter 23 emits a sonar pulse, integrator 35 begins to charge.

When the receiver 25 receives an echo pulse that rebounds from the surface of the water, a negative pulse is produced at the base of transistor $T_1$. When this occurs, current flow through transistor $T_1$ decreases and the resulting positive pulse at its collector is fed through condenser $C_3$ and zener diode $D_3$ to the base of transistor $T_2$. This increases the flow of current through transistor $T_2$ and produces a negative pulse at its collector which in turn decreases the flow of current through the cathode follower circuit of transistor $T_3$ and provides a negative step at its emitter. This negative step at the emitter of transistor $T_3$ is coupled to the base of transistor $T_4$ through condenser $C_4$ and diode $D_{24}$. This decreases the flow of current through transistor $T_4$, increases the potential at the collector of transistor $T_4$, increases the flow of current through the cathode follower circuit of transistor $T_5$ and provides a positive step at the emitter of transistor $T_5$.

The positive potential and the negative potential respectively produced at the emitters of transistors $T_5$ and $T_3$ back biases the diode bridge $B_1$ and therefore blocks the flow of current from the floating power supply 31 through diode $D_{14}$, resistor $R_{12}$, the bridge $B_1$, transistor $T_6$ and diode $D_{15}$. This conditions the bridge $B_1$ such that the charging circuit from negative power supply line 29 and potentiometer $R_{15}$ for integrator 35 is interrupted. Simultaneously, the positive potential and the negative potential produced at the emitters of transistors $T_5$ and $T_3$ is not imposed across the diode bridge $B_2$ due to the orientation of diodes $D_{16}$ and $D_{21}$. Thus current from the floating power supply 31 flows through the circuit that includes resistor $R_{14}$, diode bridge $B_2$ and resistor $R_{13}$. This conditions the bridge $B_2$ such that the junction of bridge $B_1$ with integrator 35 is shorted to ground through bridge $B_2$. Thus, when the echo returns to the receiver 25, the charging cycle for integrator 35 ends.

Inasmuch as the velocity of sound through the water medium varies with changes in the water temperature, errors of this kind are minimized by manual adjustment of the variable arm of potentiometer $R_{15}$. This changes the charging rate of the integrator 35 such that the accumulated potential in the integrator more accurately reflects the precise depth of the transmitter-receiver transducer 21 on the vessel.

A predetermined constant potential is also applied to the input circuit of summing amplifier 37 from the positive power supply line 27 and the voltage dividing network of resistors $R_{18}$ and $R_{19}$ through variable resistor $R_{20}$. This transfers the depth measuring reference from the position of the transmitter-receiver transducer 21 on the vessel to the bottom or keel of the vessel.

The output signal of the summing amplifier 37 is also corrected to compensate for errors due to pitching of the ship at the various locations of its missile launching tubes. The missile launching tubes on the vessel are preferably positioned in pairs at regularly spaced intervals along the launching deck as indicated in FIG. 1 of the drawing at 3, 5, 7, 9, 11, 13, 15 and 17. Although the transmitter-receiver transducer 21 could be located at any suitable location, it is preferably located as shown adjacent to the pair of tubes at 15. Thus, as the vessel pitches from its horizontal attitude, a plurality of corrections in one direction must be applied to accurately determine the depth of the tubes at 3, 5, 7, 9, 11 and 13 and another correction in the opposite direction must be applied to accurately determine the depth of the other pair of tubes at 17. This is accomplished by pitch potentiometers $R_{23}$ and $R_{26}$ and their associated circuits through the manually controlled switches $S_1$, $S_2$, $S_3$, $S_4$, $S_5$, $S_6$, $S_7$ and $S_8$. Thus, for example, when a depth measurement from the pair of missile tubes at 13 is desired, switch $S_6$ is closed and pitch correction potential at the variable arm of potentiometer $R_{26}$ is reduced an amount proportional to the predetermined ratio of the impedance of resistor $R_{33}$ to the impedance of the entire series resistor divider network. Depth measurement at any of the other missile tube locations is similarly obtained by closing its associated manually operable switch. By combining in this way the above described correction potentials through resistors $R_{21}$ and $R_{34}$ with the accumulated potential in integrator 35 in summing amplifier 37, the desired accurate and reliable indication of the depth of the submerged platform or vessel is obtained in indicator or recorder 33.

Obviously many modifications and variations of the present invention are possible in the light of the above teachings. It is therefore to be understood that within the scope of the appended claims, the invention may be practiced otherwise than as specifically described.

What is claimed is:
1. Apparatus for determining the depth of a vessel in a fluid medium said apparatus comprising:
 (a) a sonar transmitter;
 (b) a sonar receiver;
 (c) an integration circuit;
 (d) a direct current floating reference voltage;
 (e) a diode bridge circuit having four corner terminals with a diode between each pair of adjacent terminals, the diodes being oriented so as to provide a pair of parallel low resistance paths between a pair of opposite corners of the bridge circuit;
 (f) a circuit, including the pair of low resistance paths of the diode bridge circuit, coupled to the reference voltage;
 (g) means for charging the integration circuit through a circuit that includes the parallel paths between the other pair of terminals of the bridge circuit when the low resistance paths across the bridge circuit are energized by the reference voltage;

(h) and means responsive to reception of an echo pulse in the receiver for blocking flow of current from the reference voltage through the low resistance paths of the bridge circuit;

(i) and means including a pitch potentiometer for modifying the charge developed across the integration circuit and converting slant depths of the vessel into vertical depths.

2. Apparatus for determining the depth of a vessel in a fluid medium said apparatus comprising:

(a) a sonar transmitter;

(b) a sonar receiver;

(c) an integration circuit;

(d) a direct current floating reference voltage;

(e) a diode bridge circuit having four corner terminals with a diode between each pair of adjacent terminals, the diodes being oriented so as to provide a pair of parallel low resistance paths between a pair of opposite corners of the bridge circuit;

(f) a circuit, including the pair of low resistance paths of the diode bridge circuit, coupled to the reference voltage;

(g) a means for charging the integration circuit through a circuit that includes the parallel paths between the other pair of terminals of the bridge circuit when the low resistance paths across the bridge circuit are energized by the reference voltage;

(h) and means responsive to reception of an echo pulse in the receiver for blocking flow of current from the reference voltage through the low resistance paths of the bridge circuit;

(i) and means for adjusting the charging rate of the integration circuit as the temperature of the fluid through which the sonar signal travels changes;

(j) and means including a pitch potentiometer for modifying the charge developed across the integration circuit and converting slant depths of the vessel into vertical depths.

References Cited by the Examiner
UNITED STATES PATENTS

| | | |
|---|---|---|
| 2,101,076 | 12/1937 | Laboureur et al. _____ 340—3 X |
| 2,599,586 | 6/1952 | Ross _____ 340—3 X |
| 2,623,116 | 12/1952 | Rymes. |
| 2,780,795 | 2/1957 | Ambrosio _____ 340—3 |
| 3,006,184 | 10/1961 | Goldman. |

CHESTER L. JUSTUS, *Primary Examiner.*

R. A. FARLEY, *Assistant Examiner.*